Patented May 19, 1925.

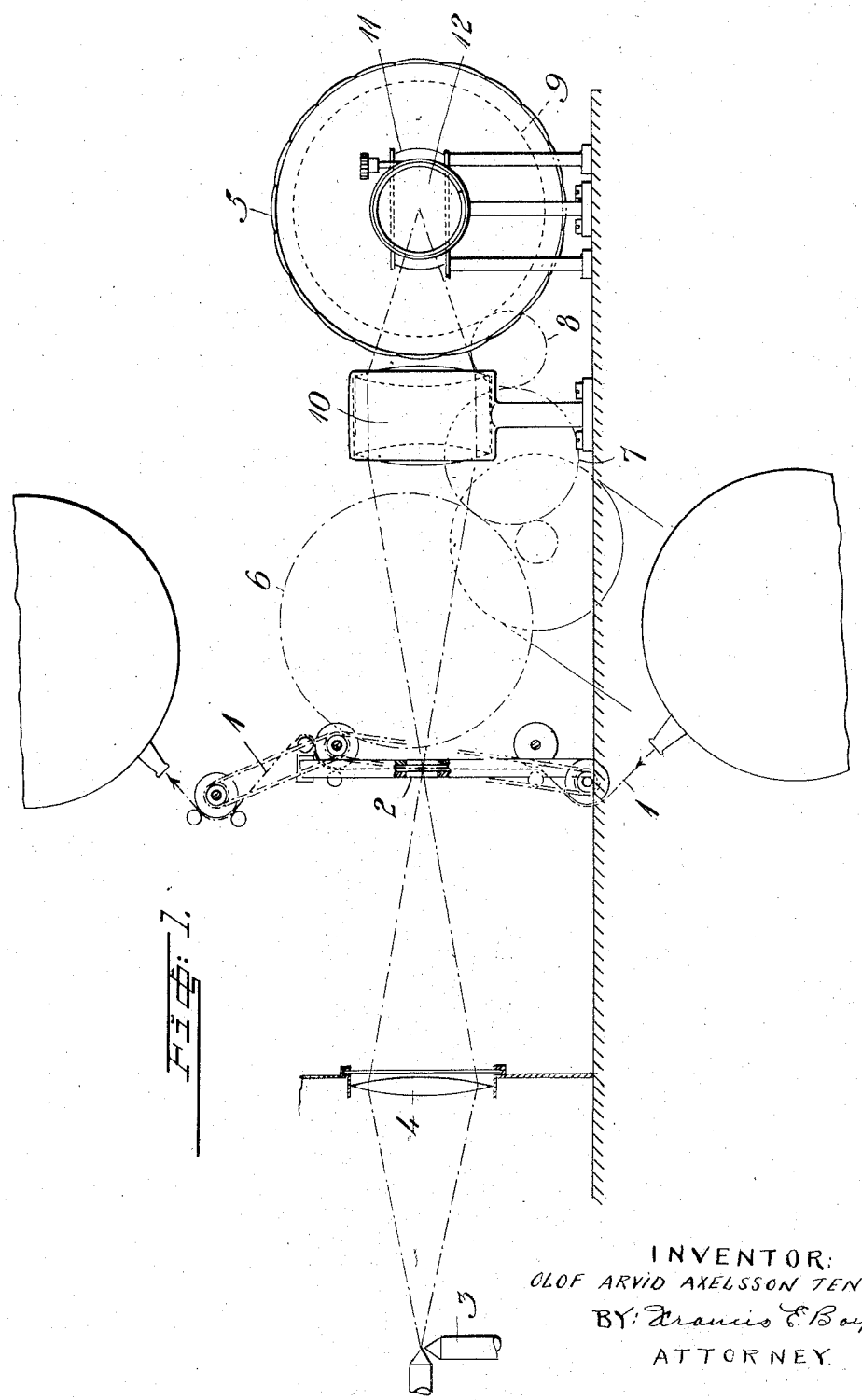

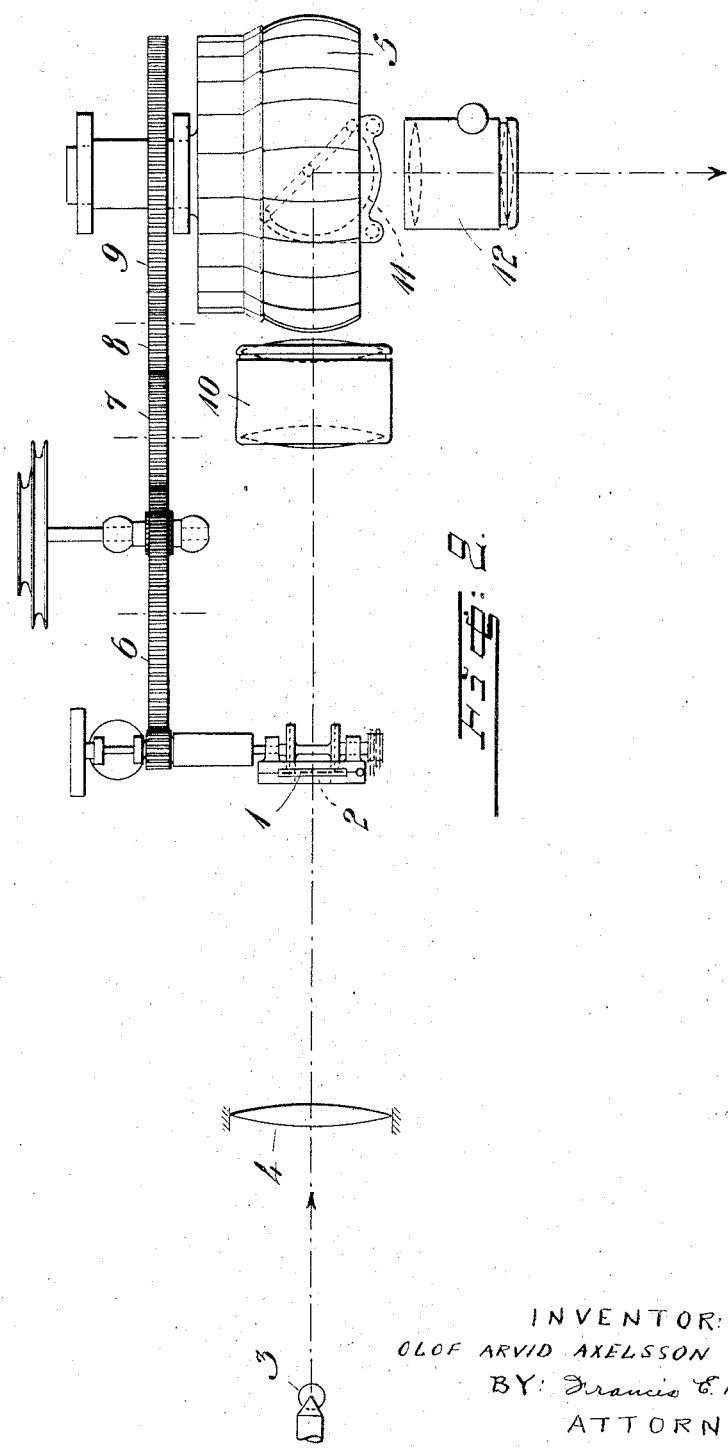

1,538,070

UNITED STATES PATENT OFFICE.

OLOF ARVID AXELSSON TENOW, OF STOCKHOLM, SWEDEN, ASSIGNOR OF ONE-HALF TO GUSTAF VIKTOR LEONARD ROSE, OF UPPSALA, SWEDEN.

APPARATUS FOR PROJECTING CINEMATOGRAPH PICTURES.

Application filed March 5, 1924. Serial No. 696,935.

*To all whom it may concern:*

Be it known that I, OLOF ARVID AXELSSON TENOW, a subject of the King of Sweden, residing at Stockholm, Sweden, have invented new and useful Improvements in Apparatus for Projecting Cinematograph Pictures, of which the following is a specification.

The present invention refers to an apparatus for projecting cinematograph pictures. The characteristics of the invention consist in the fact that in the same there is an optical system arranged in such a manner that a real optic image of the film is projected within the apparatus. In the apparatus there can further be arranged a movable optic system in such a manner that a real image of every picture on the film, which is movable with a constant speed, in the apparatus occupies a definite, immovable position.

On the accompanying drawings is shown only as an example an apparatus according to the invention in Fig. 1 in vertical longitudinal section and in Fig. 2 in plan view.

1 is a film moving past the picture opening 2 with a constant speed, this film being illuminated by an optical system of illumination 3, 4 of a known kind. 5 is a rotating lens-wheel, preferably of aplanatic meniscuses, which by means of gears 6, 7, 8, 9 from the propulsive device of the film receive such a rotary speed in relation to the speed with which the film is moving that a new lens passes the optical axis of the system each time a picture on the film passes the said axis. In the event of aplanatic meniscuses being made use of, their inner aplanatic points are all situated on the axis of the lens-wheel, while their outer aplanatic points are rotating round this axis. Between the film and the lens-wheel there is arranged a projection system 10, whose power and position are chosen in such a manner that it alone projects the film upon the point of intersection between the optical axis of the system and the outermost part of the path of the exterior aplanatic points, while the enlargement is such that the movement (caused by the motion of the film), of the film-image thus projected has the same speed as the exterior or outer aplanatic points have in virtue of the rotation of the lens-wheel. The image then remains at rest in the inner aplanatic point. This stationary image is projected upon the screen by means of the projection system 11, 12.

Should greater power of light and a better quality of image be wanted, a corresponding aplanatic lens system may be used instead of every aplanatic meniscus.

What I claim is:

An apparatus for projecting cinematograph pictures comprising, in combination, a film, means for moving said film with a constant speed, a rotating wheel of aplanatic lenses for compensating the wandering of the pictures, and a projecting system disposed between the film and the lens-wheel, the power and position of said system being chosen in such a manner that it alone projects the film upon the point of intersection between the optical axis of the said projection system and the outermost part of the path of the exterior aplanatic points, while the enlargement is such that the movement caused by the motion of the film of the film-image thus projected has the same speed as the outer aplanatic points have by virtue of the rotation of the lens-wheel.

In testimony whereof I have signed my name to this specification.

OLOF ARVID AXELSSON TENOW.